(No Model.)
W. T. HARRISON.
TANNING APPARATUS.
No. 514,549.　　　　　　　　　Patented Feb. 13, 1894.
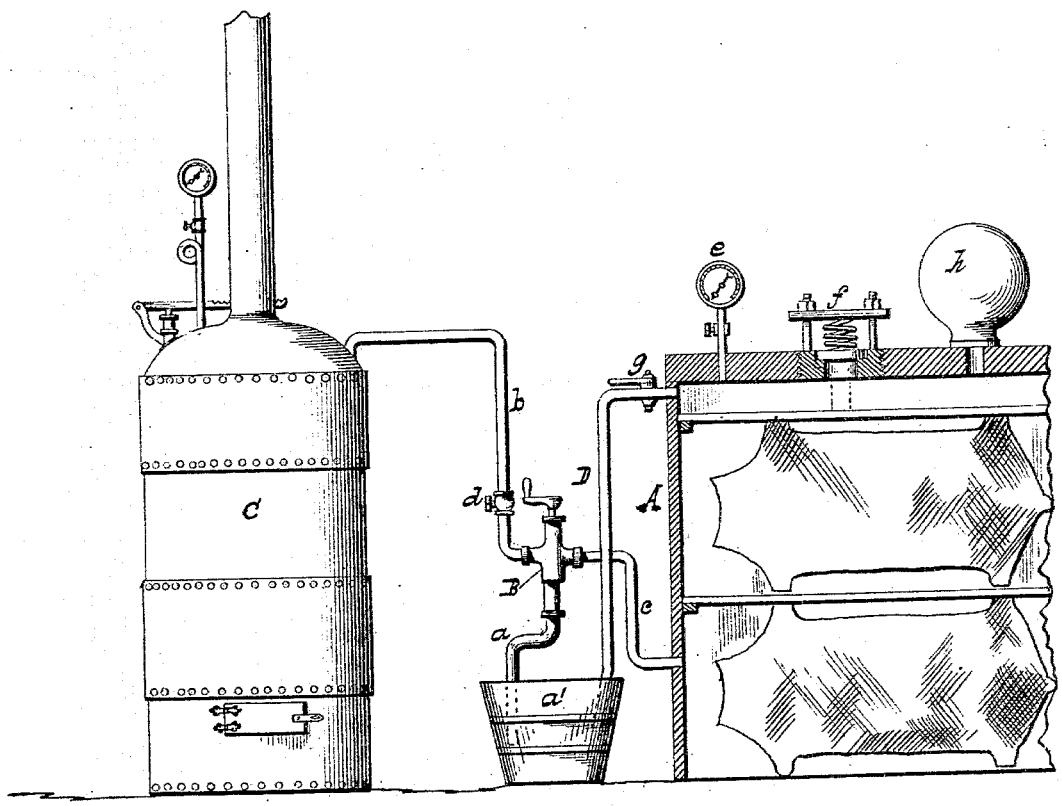
Witnesses
Inventor
William T. Harrison
Per William A. McKenney
Attorney

UNITED STATES PATENT OFFICE.

WILLIAM T. HARRISON, OF POOLER, ASSIGNOR OF TWO-THIRDS TO M. ROHRER AND J. W. PRESTON, OF MARLOW, GEORGIA.

TANNING APPARATUS.

SPECIFICATION forming part of Letters Patent No. 514,549, dated February 13, 1894.

Application filed October 5, 1893. Serial No. 487,281. (No model.)

*To all whom it may concern:*

Be it known that I, WILLIAM T. HARRISON, a citizen of the United States, residing at Pooler, in the county of Chatham and State of Georgia, have invented certain new and useful Improvements in Tanning Hides; and I do hereby declare the following to be a full, clear, and exact description of the invention, such as will enable others skilled in the art to which it appertains to make and use the same, reference being had to the accompanying drawing, and to the letters of reference marked thereon, which form a part of this specification.

My invention relates to the tanning of hides by the action of tannic acid, or other tanning liquor, which, among other ways, as heretofore practiced, has been supplied to the hides by producing a vacuum in the vat or vessel, containing the hides and pumping the tanning liquor into the vat. The pressure of the liquor in the vat has also been produced by exhausting and pumping alternately by the action of an exhaust, and a force, pump.

In my invention, the tanning liquor is introduced into the vat or vessel simultaneously with, and by the aid of, steam to primarily heat or warm the liquor to promote or expedite its action upon the hides, to secure a circulating of the liquor, and to raise the pressure of the liquor within the vat when the circulation is arrested; and to these ends my invention consists of certain apparatus substantially as hereinafter more fully disclosed and pointed out in detail in the claim.

In the accompanying drawing, the figure is a partly side and a partly sectional, view of my improved apparatus.

In carrying out my invention, I employ a vat or vessel A suitably adapted to permit of the hanging or suspending therein of the hides or skins in the required quantity or depth and one above the other. I also employ an injector B having a pipe $a$ dipping into or communicating with a tub or tank $a'$ containing the tanning liquor—tannic acid, or other suitable solution or compound for the purpose, and which injector is also connected to a steam-boiler C, near its upper end, by a pipe $b$, and to the vat or vessel A, at or near its bottom, by a pipe $c$. The purpose of this injector is to introduce or inject the tanning liquor, in a warmed or heated state, into the vat A, the action of the steam passing through the injector sucking the liquor from the tub or tank into the injector, whence this liquor is carried with the steam through the pipe $c$ into the vat A, more especially at the initial stage of the introduction of the liquor into the latter, thus warming or heating the liquor and effecting the filling of the vat therewith. The pipe $b$ has a cock or valve $d$ to regulate the supply of steam to the injector according to its working capacity.

The vat or vessel A has in its upper part a pressure gage $e$ to determine the internal joint pressure of the liquor and steam in the vat to which it may be desired to subject the hides or skins. Also in the upper part of the vat or vessel A is a nut-and-spring-seated escape or safety-valve $f$ to automatically regulate the pressure within the vat or vessel to prevent excess of the predetermined pressure sustaining capacity of the vat.

D is a pipe connected to the upper part of the vat or vessel A and also communicating with the tub or tank $a'$ containing the liquor, and has a valve or cock $g$ which, when open and the injector is at work, permits the pipe D to return the overflow liquor to the tub or tank $a$, whence said liquor is again taken up by the injector and passed back into the vat and re-used. Also by means of valve $g$ in pipe D, the same pressure is maintained in the vat A continuously during the working of the injector and when the injector is not working, by closing valve $g$, the pressure is maintained in the vat; also the tanning operation can be performed while maintaining a pressure in the vat and at the same time keeping up a circulation, or said operation can be effected independently of said circulation, the tanning operation being hastened by the circulation, and by the heated or warmed liquor as also by the pressure, applied either separately or in conjunction therewith, continuously or not continuously.

In order to allow for a little expansion to facilitate the working of the injector, an air-chamber is applied to the top of the vat or vessel A.

At the initial stage of the introduction of the liquor into the vat, the overflow cock or valve $g$ is opened and the injector set in operation, from which it will be seen that the flow of steam through the injector simultaneously with the sucking of the liquor from the tub or tank $a'$, thus setting up a circulation, will at the outset begin to warm the liquor, the valve or cock $g$ being kept open and the overflow maintained until the required temperature has been reached, the valve or cock $g$ then being closed. This heating or warming up of the liquor will, it is obvious, have the effect to cause the liquor to act more quickly and advantageously upon the hides than would be the case were the liquor introduced cold. After thus warming or heating up the liquor, the valve or cock $g$ being closed, the action of the injector is kept up until the required pressure, is attained, which will be duly noted by the steam-gage, relief from excess of pressure being provided for by the valve $f$, when the action of the injector is stopped. It is the intention to throw a pressure of say ten pounds to the square inch upon the hides or skins in the vat or vessel and keep this up for a certain length of time and then let off the pressure, and so on alternately for a short time, by which I plump the hides, expanding the same and opening the pores thereof, which, with the warming or heating of the liquor, allows the liquor to enter the hides and effect the tanning operation in three or four days, and then by allowing the hides to remain in the liquor for about a week, they shrink up to their original thickness, the hides then being removed.

I claim and desire to secure by Letters Patent—

In an apparatus for hydraulic tanning, the combination of a liquor tank or tub, a vat having a valved overflow-pipe connecting with said tank, a steam boiler or generator, and an injector connecting with said boiler or generator and vat, substantially as set forth.

In testimony whereof I affix my signature in presence of two witnesses.

W. T. HARRISON.

Witnesses:
J. F. GRAY,
R. B. COLEMAN.